Patented June 8, 1937

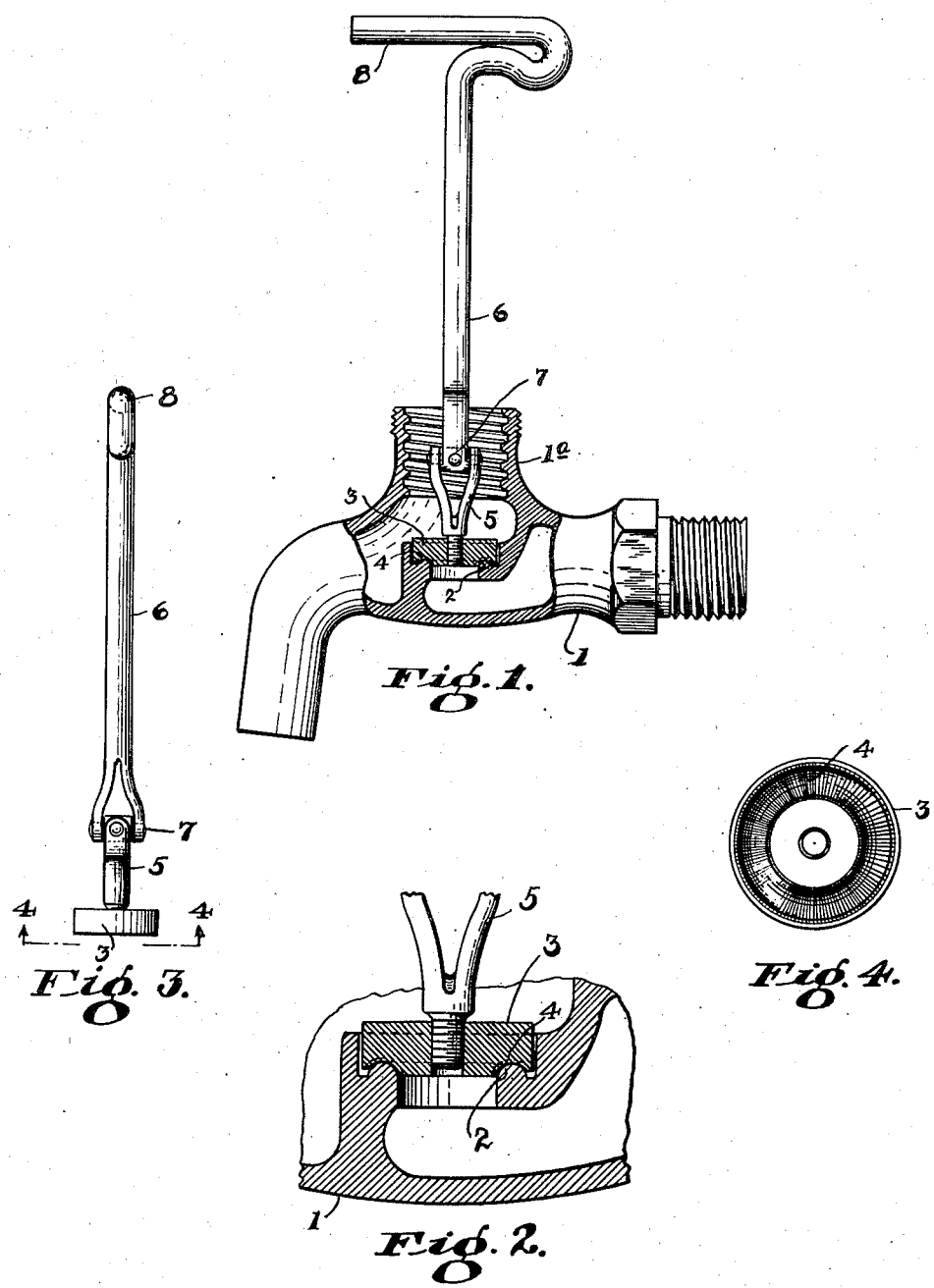

2,082,999

UNITED STATES PATENT OFFICE 2,082,999

REFINISHING DEVICE FOR FAUCET VALVE SEATS

Jay C. Angel, East Cleveland, Ohio

Application April 28, 1934, Serial No. 723,005

1 Claim.  (Cl. 90—12.5)

This invention relates to an improved form of device for refinishing the valve seat of a faucet.

It is a well known fact that in the course of time a valve seat of the familiar form of faucet, as illustrated in the accompanying drawing, will become worn with grooves and other irregularities and that consequently the valve leaks. Such condition of the valve seat, if not corrected, will not only continue to permit leaking but there will also be necessitated the renewing of the valve washer more frequently than would otherwise be required.

There are numerous prior devices for grinding the valve seat of a faucet, but so far as I am aware, they are all of comparatively complicated and expensive constructions and furthermore they are not wholly dependable since they have no means of insuring engagement of the refinishing disk with the valve seat in a true manner.

The object of the present invention is to provide such a device which is of a comparatively simple construction and hence not costly to manufacture and which at the same time is provided with means for insuring true engagement with the valve seat throughout the entire refinishing operation.

Other objects will appear from the following description and claim when considered together with the accompanying drawing.

Fig. 1 is a view partly in elevation and partly in section and illustrates the manner of employment of my present device;

Fig. 2 is an enlarged view of a portion of Fig. 1;

Fig. 3 is an elevation of my improved device taken at 90° to Fig. 1; and

Fig. 4 is a view corresponding to line 4—4 of Fig. 3.

Referring to the accompanying drawing, the conventional form of faucet 1 is shown as being provided with the annular valve seat 2 which has a rounded upper surface for engagement by the washer member of the valve. It is this seat portion 2 which in the course of time becomes worn with grooves and pitted areas which prevent proper and efficient sealing engagement of the valve.

My device for refinishing the valve seat 2 comprises the metal disk 3 which is of sufficient hardness to produce the refinishing operation and which has its under surface provided with an annular form of groove 4 which is of slightly larger width than the valve seat 2 and which is provided with serrations or other suitable form of surface for performing the refinishing operation.

The disk 3 is screw-threaded on to the lower end of the operating shank which comprises the lower portion 5 and the upper portion 6, these two portions of the shank being connected by the universal joint 7 which is located near the disk 3 and at a point within the upper part 1a of the faucet and below the top thereof when the device is in operating position. The extreme upper end of the shank portion 6 is formed with a handle portion 8 for conveniently gripping the same.

It will be observed that the shank portion 5 is connected to the disk 3 at the center thereof and extends axially from the upper side thereof and that this point of connection is well within the inner circumference of the annular groove 4. The purpose of this particular manner of connection is to prevent cocking of the disk 3 during the refinishing operation, or in other words, to insure proper seating of the groove 4 at all times upon the valve seat 2.

It is to be understood that any suitable form of refinishing disk may be substituted upon the lower end of the shank portion 5 according to the particular size and form of valve seat in any given faucet.

In using the present form of device, the grinding disk 3, which in the present illustration has an action similar to that of a file, is placed upon the valve seat so that the refinishing groove 4 will engage in a correct manner over the valve seat 2. With the refinishing disk in such position, it is oscillated thereupon by means of the hand of the operator which grips the upper portion of the shank 6 and the handle 8. Sufficient pressure will be exerted by the hand of the user during such oscillating movement so as to effect the refinishing operation. The form of grinding surface herein illustrated is not intended to limit the scope of this invention as any suitable form of grinding surface may be employed.

By virtue of the universal joint 7 and the particular point of connection between the shank portion 5 and the refinishing disk 3, any inaccuracies of the oscillating movement by the hand of the user will be absorbed so as not to be transmitted to the refinishing disk, and there is precluded any danger of the disk 3 becoming dislodged from true refinishing engagement with the valve seat during the oscillating movement, even though the shank portion 6 might be accidentally tilted or cocked during operation thereof. Furthermore, by having the universal coupling located at a point within the faucet, any such tilting of the shank portion 6 will be limited by the upper part 1a thereof. Thus, the danger of extreme cocking or tilting of the shank portion 6 is prevented in this manner and the danger of any tilting or cocking of the disk 3 as a result of such improper manipulation of the shank portion 6 becomes nil.

Thus, I have produced a device which is of comparatively simple construction and which therefore can be manufactured and sold at a low price while at the same time it may be manipulated in a convenient and efficient manner. With my device, the valve seat is engaged by the refinishing member in a true manner and the seat is consequently ground in a proper manner; whereas with the prior devices there can not be obtained a properly refinished seat since there is no dependable assurance that the refinishing member will engage the seat in a truly concentric manner. Experience has shown that the prior devices generally engage the valve seat in an off-center relation which prevents proper refinishing. The condition of the valve seat, as a result, is made worse instead of better and the purpose of the refinishing operation is defeated. Moreover, such improper treatment of the valve seat not only fails to improve the sealing engagement of the valve but causes the valve washer to wear more rapidly. As above stated, these objectionable conditions are overcome with my improved device.

What I claim is:

A device for re-finishing the valve seat of a faucet, comprising a lower shaft portion, a refinishing disk attached to the lower end of said lower shaft portion and having an annular refinishing portion upon its under surface, an upper operating shaft portion, a universal joint connection between the lower end of the upper operating shaft portion and the upper end of the lower shaft portion, the point of attachment of the lower shaft portion to the disk being within the inner circumference of said annular refinishing portion, and said universal joint connection being located at a point below the upper end of the faucet when the device occupies operating position, said parts being so constructed and arranged that the device may be given an oscillating movement with the re-finishing portion in engagement with the valve seat while pressure is applied thereto through the operating shaft and any inaccuracies of oscillative movement of the operating shank will be limited in their extent by the upper part of the faucet and will be absorbed by the said universal joint, whereby said re-finishing disk will be effectively maintained in proper position upon the valve seat at all times during such oscillative movement.

JAY C. ANGEL.